United States Patent
Suzuki et al.

(10) Patent No.: US 7,824,814 B2
(45) Date of Patent: Nov. 2, 2010

(54) POWER GENERATION CONTROL SYSTEM FOR FUEL CELL

(75) Inventors: Keisuke Suzuki, Fujisawa (JP); Takeaki Obata, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 881 days.

(21) Appl. No.: 11/576,009

(22) PCT Filed: Sep. 16, 2005

(86) PCT No.: PCT/JP2005/017552

§ 371 (c)(1),
(2), (4) Date: Mar. 26, 2007

(87) PCT Pub. No.: WO2006/033420

PCT Pub. Date: Mar. 30, 2006

(65) Prior Publication Data

US 2008/0193804 A1    Aug. 14, 2008

(30) Foreign Application Priority Data

Sep. 24, 2004 (JP) .............................. 2004-277925
Sep. 24, 2004 (JP) .............................. 2004-277926

(51) Int. Cl.
H01M 8/04 (2006.01)

(52) U.S. Cl. ..................... 429/428; 429/443; 429/444

(58) Field of Classification Search ................... 429/13, 429/22, 24, 25, 428, 443, 444; 700/291, 700/295–298
See application file for complete search history.

(56) References Cited

U.S. PATENT DOCUMENTS

| 5,624,768 A * | 4/1997 | Tanokura ..................... 429/23 |
| 2002/0022161 A1 | 2/2002 | Kurosaki et al. |
| 2002/0172847 A1 | 11/2002 | Aoyagi et al. |
| 2004/0028968 A1 | 2/2004 | Okamoto |

FOREIGN PATENT DOCUMENTS

| JP | 10-326625 A | 12/1998 |
| JP | 2000-033585 A | 2/2000 |
| JP | 2001-025105 A | 1/2001 |
| JP | 2002-271909 A | 9/2002 |
| JP | 2003-249234 A | 9/2003 |
| JP | 2004-096835 A | 3/2004 |

* cited by examiner

*Primary Examiner*—Gregg Cantelmo
(74) *Attorney, Agent, or Firm*—Foley & Lardner LLP

(57) ABSTRACT

A power generation control system for a fuel cell, which includes: a unit (102) for computing a target output power of the fuel cell; a unit (104) for taking output power from the fuel cell based on the computed target output power; a unit (101) for computing an output parameter for controlling supply of reactant gas to the fuel cell as a signal preceding in time the target output power; and a unit (103) for controlling an operating point for the supply of reactant gas based on the computed output parameter.

8 Claims, 10 Drawing Sheets

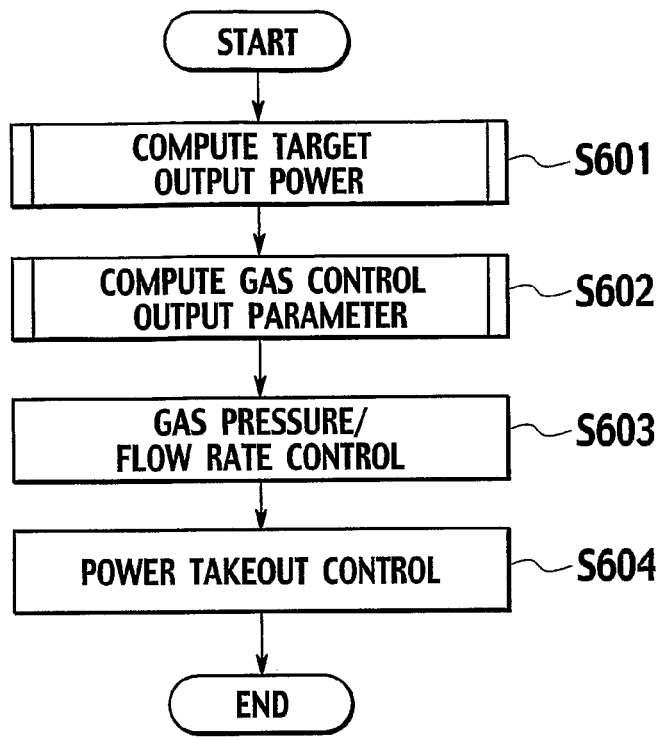
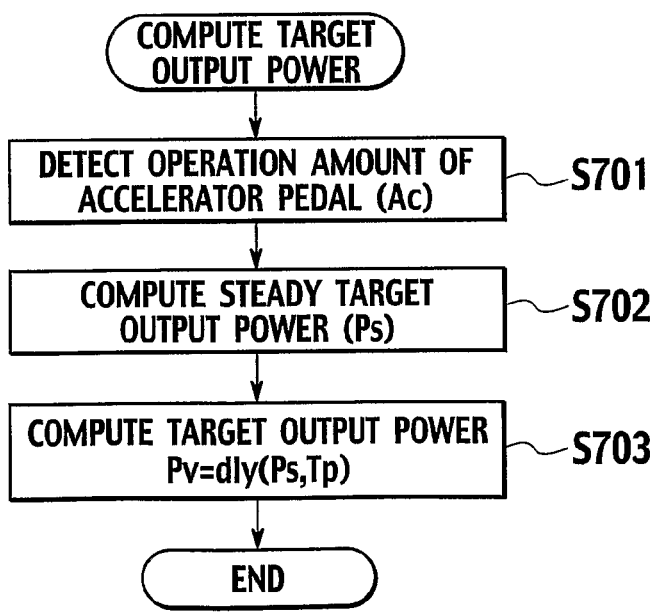

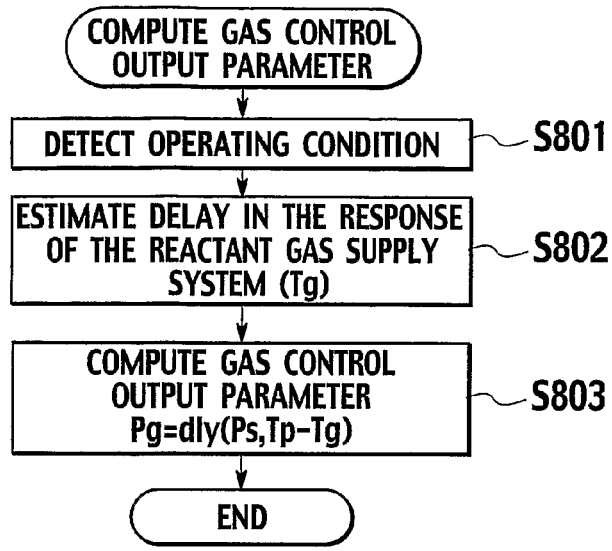
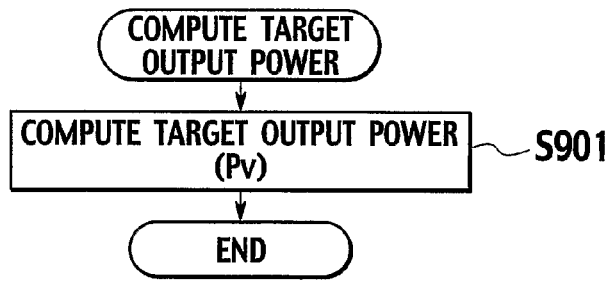
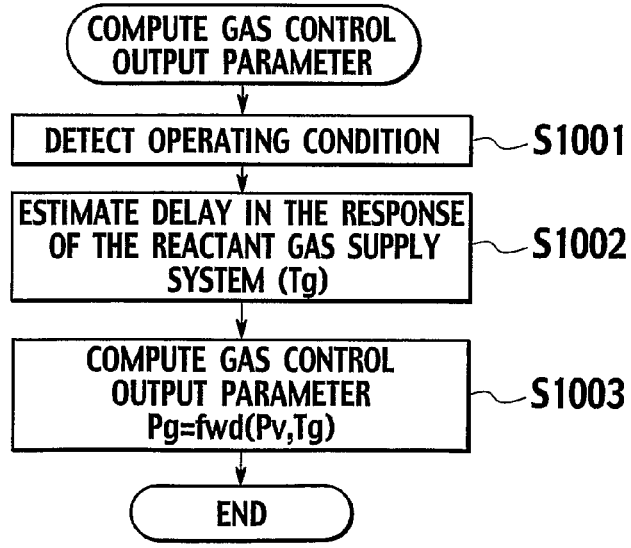

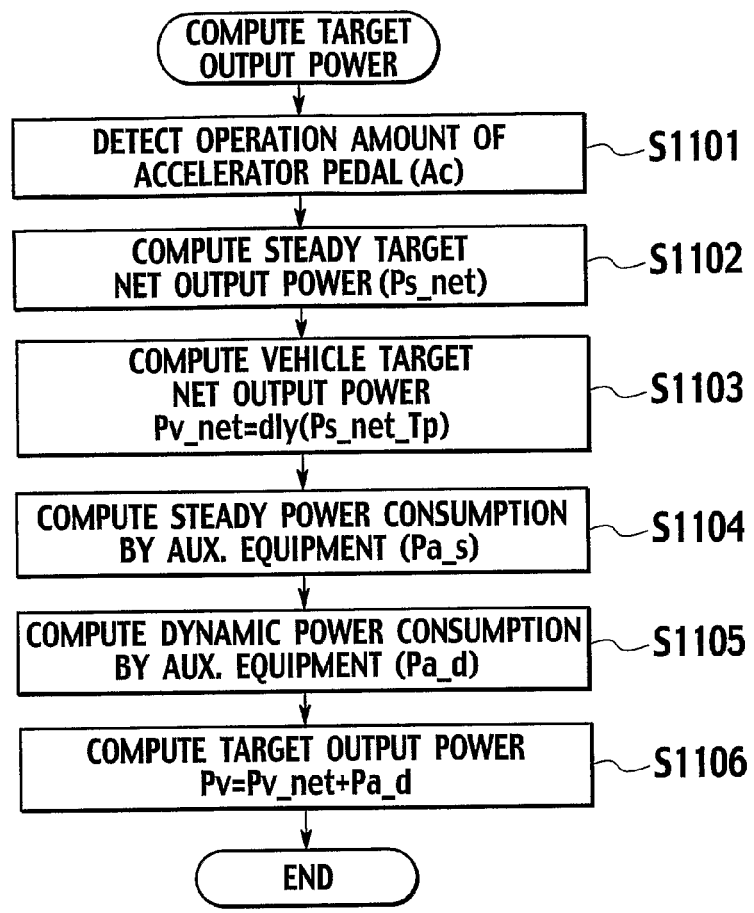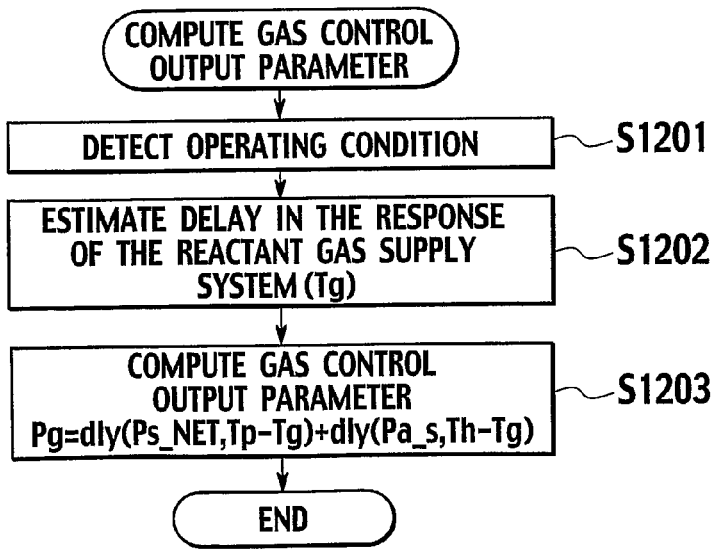

POWER GENERATION CONTROL SYSTEM FOR FUEL CELL

TECHNICAL FIELD

The present invention relates to a power generation control system for a fuel cell.

BACKGROUND ART

A fuel cell is an electrochemical device to convert chemical energy of fuel gas such as hydrogen gas and oxidizer gas containing oxygen electrochemically into electric energy. A typical fuel cell has an electrolyte membrane in contact with an anode and a cathode on either side. Fuel gas is continuously fed to the anode and the oxidizer gas is continuously fed to the cathode. The electrochemical reactions take place at the electrodes to produce an electric current through the electrolyte membrane energy, while supplying a complementally electric current to the load.

Load to a fuel cell used in a vehicle application as a drive power supply rapidly changes in a wide range from idling to full acceleration. In order to prevent insufficient supply of reactant gas at any site in fuel cell stack, fuel gas and oxidant gas are supplied to the fuel cell at a mass flow rate more than a mass flow rate necessary to produce the required output current. A ratio of mass flow rate of the supplied reactant gas to a mass flow rate of reactant gas theoretically required for producing the output current is referred to as a gas supply excess rate, or a stoichiometric ratio (SR). Operation under excessive stoichiometric ratio results in an increased power consumption of auxiliary equipment such as an air compressor for supplying air as oxidant gas, lowering fuel efficiency of the fuel cell system.

In the case that load to the fuel cell increases and the supply of reactant gas becomes insufficient for the requested output current, current may concentrate at local areas inside the fuel cell stack, causing a local temperature increase and lowering output voltage of the fuel cell.

Japanese Patent Application Laid-Open Publication No. 10-326625 discloses a device for limiting output current of a fuel cell so that the output current does not exceed the amount corresponding to reaction gas supply rate, when load to the fuel cell drastically increases, and thereby supplying the reaction gas at a rate determined based on the output current thus limited.

DISCLOSURE OF INVENTION

In the above-mentioned device, however, the rate of change of output current taken from the fuel cell is controlled to be within the range of the rate of change at which supply of fuel gas and oxidant gas can follow. In other words, the device delivers an output power delaying in phase from the target output power by a delay in the response of reactant gas supply.

The present invention was made in the light of the problem. An object of the present invention is to provide a fuel cell capable of delivering output power as requested without causing insufficient supply of the reactant gas.

An aspect of the present invention is a power generation control system for a fuel cell comprising: a target output power computing unit for computing a target output power of the fuel cell; an output power control unit for taking output power from the fuel cell based on the target output power computed by the target output power computing unit; a gas control output parameter computing unit for computing an output parameter for controlling supply of reactant gas to the fuel cell as a signal preceding in time the target output power; and a gas control unit for controlling an operating point for the supply of reactant gas based on the output parameter computed by the gas control output parameter computing unit.

BRIEF DESCRIPTION OF THE DRAWINGS

The invention will now be described with reference to the accompanying drawings wherein:

FIG. 4A shows an output current of a fuel cell as a function of time. FIG. 4B shows a gas control output parameter as a function of time. FIG. 4C shows a gas pressure or flow rate as a function of time.

FIG. 5A shows an output current as a function of time. FIG. 5B shows a gas control output parameter as a function of time. FIG. 5C shows a gas pressure or flow rate as a function of time.

FIG. 6 is a general flow chart according to a first embodiment of the present invention.

FIG. 7 is a flow chart describing procedures for computation of a target output power according to the first embodiment.

FIG. 8 is a flow chart describing procedures for computation of a gas control output parameter according to the first embodiment.

FIG. 9 is a flow chart describing procedures for computation of a target output power according to a second embodiment of the present invention.

FIG. 10 is a flow chart describing procedures for computation of a gas control output parameter according to the second embodiment.

FIG. 11 is a flow chart describing procedures for computation of a target output power according to a third embodiment of the present invention.

FIG. 12 is a flow chart describing procedures for computation of a gas control output parameter according to the third embodiment.

BEST MODE FOR CARRYING OUT THE INVENTION

Figure 1:
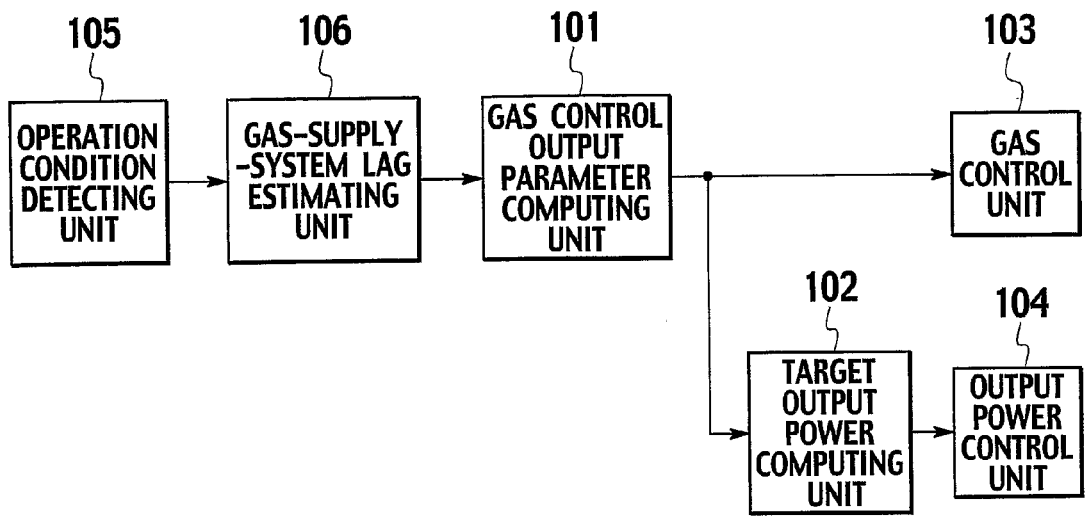
FIG. 1 is a block diagram showing principal components of a power generation control system for a fuel cell according to the present invention.

Embodiments of the present invention will be explained below with reference to the drawings, wherein like members are designated by like reference characters.

Figure 2:
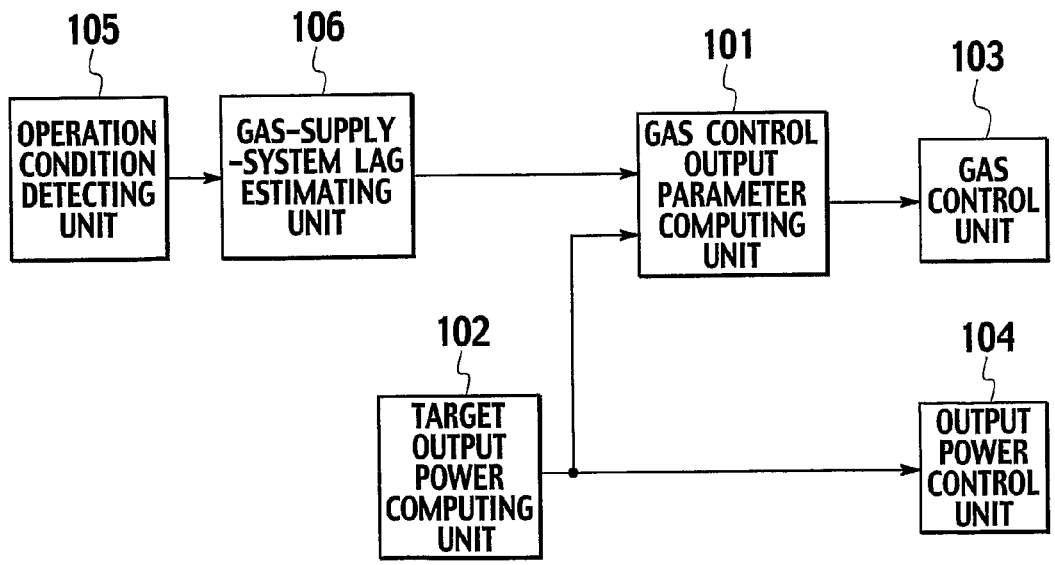
FIG. 2 is a block diagram showing principal components of a power generation control system for a fuel cell according to the present invention.

Power generation control systems for a fuel cell according to the embodiments of the present invention are basically configured as shown in FIG. 1 or FIG. 2. In the block diagram of FIG. 1, the power generation control system includes; an operation condition detecting unit 105 for detecting operation condition of a fuel cell; a gas-supply-system delay estimating unit 106 for estimating a delay in the response of the reactant gas supply system based on the detected value of the operation condition detecting unit 105; a gas control output parameter computing unit 101 for computing a gas control output parameter based on the output of the gas-supply-system delay estimating unit 106; a gas control unit 103 for controlling an operating point that is pressure and/or flow rate of the reactant gas, based on the output parameter from the gas control output parameter computing unit 101; a target output power computing unit 102 for computing a target output power of the fuel cell which delays in time with respect to the output parameter from the gas control output parameter computing unit 101; and an output power control unit 104 for taking an actual output power from the fuel cell based on the output of the target output power computing unit 102.

Thus, the target output power computing unit 102 computes the target output power as a signal which delays in time with respect to the output parameter from the gas control output parameter computing unit 101.

In the block diagram of FIG. 2, the power generation control system includes; an operation condition detecting unit 105 for detecting operation condition of a fuel cell; a gas-supply-system delay estimating unit 106 for estimating a delay in the response of the reactant gas supply system based on the detected value of the operation condition detecting unit 105; a target output power computing unit 102 for computing a target output power of the fuel cell; an output power control unit 104 for taking an actual output power from the fuel cell based on the output of the target output power computing unit 102; a gas control output parameter computing unit 101 for computing a gas control output parameter based on the outputs of the gas-supply-system delay estimating unit 106 and of the target output power computing unit 102; and a gas control unit 103 for controlling pressure and/or flow rate of reactant gas based on the output parameter from the gas control output parameter computing unit 101.

Thus, the gas control output parameter computing unit 101 computes the gas control output parameter as a signal which leads in time with respect to the target output power from the target output power computing unit 102.

Figure 3:
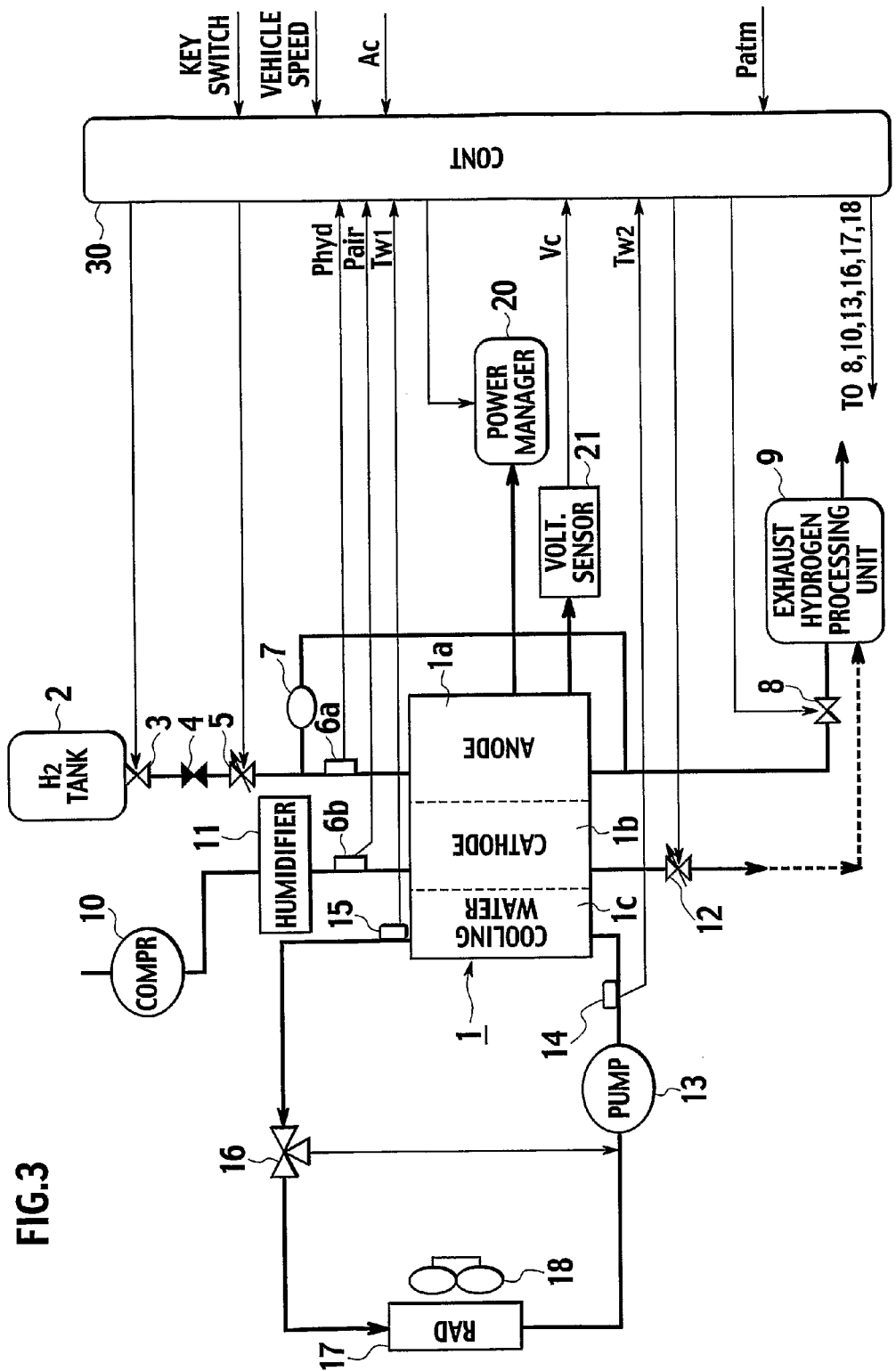
FIG. 3 is a block diagram of an exemplary fuel cell system to which the power generation control system for a fuel cell according to the present invention is applied.

FIG. 3 is a block diagram of an exemplary fuel cell system to which the power generation control system for a fuel cell according to the present invention is applied. A fuel cell 1 of FIG. 3 is a fuel cell or a fuel cell stack. Hydrogen gas is supplied to anode 1a thereof and air is supplied to cathode 1b thereof. DC power is then generated by electrochemical reaction shown below.

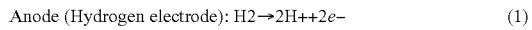

Anode (Hydrogen electrode): $H_2 \rightarrow 2H^+ + 2e^-$  (1)

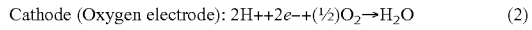

Cathode (Oxygen electrode): $2H^+ + 2e^- + (\frac{1}{2})O_2 \rightarrow H_2O$  (2)

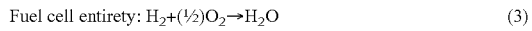

Fuel cell entirety: $H_2 + (\frac{1}{2})O_2 \rightarrow H_2O$  (3)

Hydrogen gas is supplied as a fuel gas from a hydrogen tank 2 through a hydrogen-tank stop valve 3, a pressure reducing valve 4, and a hydrogen supply valve 5 to the anode 1a. Pressure of the hydrogen gas from the hydrogen tank 2 is first reduced to a given pressure by the pressure reducing valve 4, and further reduced and controlled to be within a desired pressure range in the fuel cell by the hydrogen supply valve 5.

A hydrogen gas circulator device 7 which may be an ejector or a circulation pump is provided to a hydrogen circulation system for recirculating unused hydrogen discharged from the outlet of the anode 1a to the inlet thereof. Hydrogen gas pressure in the anode 1a is controlled by a controller 30 which feeds back hydrogen gas pressure Phyd detected by a pressure sensor 6a to the hydrogen supply valve 5. By maintaining the hydrogen gas pressure within a target pressure range, hydrogen is automatically supplied by the amount consumed in the fuel cell 1.

A purge valve 8 is provided for discharging anode off-gas from the anode 1a of the fuel cell 1 in the hydrogen circulation system, and delivering the off-gas to an exhaust hydrogen processing unit 9. The purge valve 8 plays the following three roles:

(a) To discharge nitrogen accumulated in the hydrogen circulation system, ensuring hydrogen circulation function of the system.

(b) To blow off water accumulated in gas channels inside the fuel cell 1, which may cause the gas channels to be clogged, thereby restoring a cell voltage Vc which is to be detected by a voltage sensor 21.

(C) To discharge remaining gas (air) in the hydrogen circulation system and fill the system with hydrogen gas at starting.

The exhaust hydrogen processing unit 9 either dilutes the hydrogen gas discharged through the purge valve 8 with air, or causes hydrogen in the hydrogen gas to react with air using combustion catalyst, to reduce its concentration to a level below a flammable concentration before discharging it out of the system.

Air is supplied as an oxidizer gas to the cathode 10 by a compressor 10. Compressed air from the compressor 10 is humidified by a humidifier 11, and then supplied to the cathode 1b of the fuel cell 1. The air pressure in the cathode 1b is controlled by a controller 30 which feeds back the air pressure Pair detected by a pressure sensor 6b to an air relief valve 12.

Cooling water is supplied to cooling water channels 1c provided inside the fuel cell 1. A cooling water pump 13 is provided to circulate the cooling water in a cooling water system. A three way valve 16 is provided to deliver cooling water flow to a radiator 17 or a radiator bypass, or split the cooling water flow to both. A radiator fan 18 sends air through the radiator 17 to cool the cooling water flowing therethrough. Temperatures of the cooling water are adjusted in such a manner that a temperature sensor 14 detects an inlet temperature Tw1, a temperature sensor 15 detects an outlet temperature Tw2, and the controller 30 operates the three way valve 16 and the radiator fan 18 based on the detected temperatures.

An output power taking device or power manager 20 takes electricity from the fuel cell 1 and supplies it to a motor (not shown) for driving a vehicle.

The controller 30 reads outputs from the various sensors and operates each actuator through a software program incorporated therein so as to control the power generation of the fuel cell system.

Effects of the present invention are supplementally described with reference to FIGS. 4 and 5. FIG. 4A to FIG. 4C show time charts of an output power (current) of the fuel cell, a gas control output parameter, and a gas pressure or flow rate as a function of time, describing transient power generation of the fuel cell system to which the present invention is not applied.

Figure 4A:
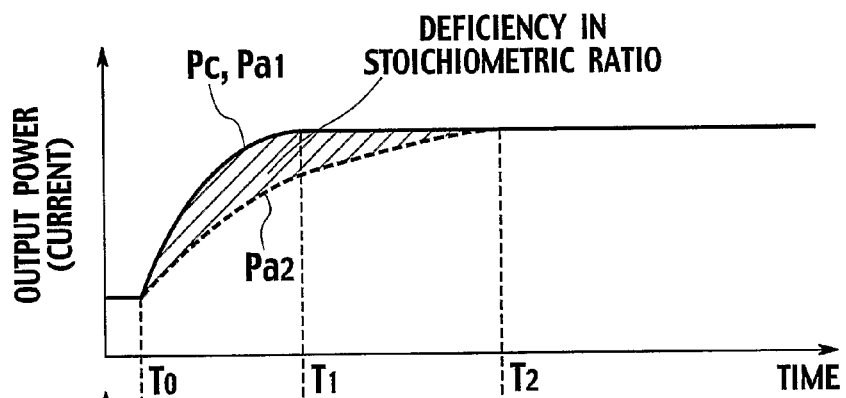
FIG. 4A-4C are time charts describing transient power generation of a fuel cell system to which the present invention is not applied.
Figure 4B:
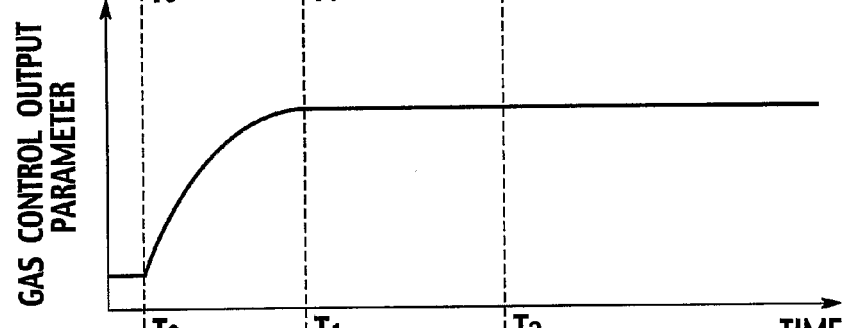

For example, when a target output power Pt for the fuel cell from a vehicle control computer rises at a given rate in a time interval between T0 and T1 as shown in FIG. 4A, a gas control output parameter also rises at a rate equivalent to that in the target output power Pt shown in FIG. 4B. An operating point for supplying the reactant gas (gas pressure and/or flow rate of the reactant gas) is determined based on the gas control output parameter. The target value of pressure and flow rate Gt also rises at a rate equivalent to that in the target output power Pt as shown by a broken line in FIG. 4C.

Figure 4C:
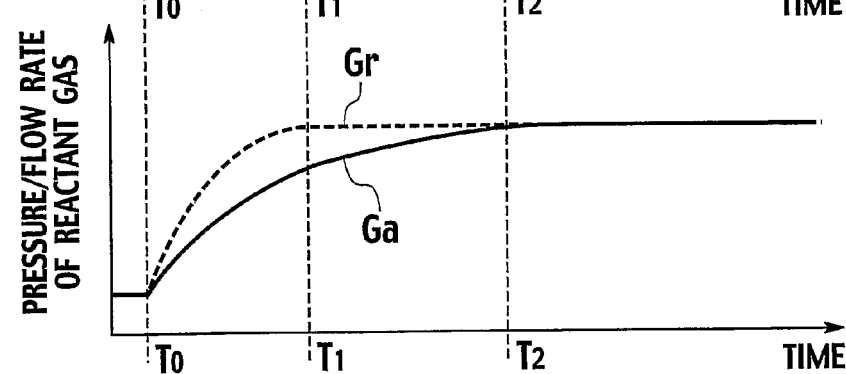

On the other hand, the actual gas pressure and flow rate Ga rises gradually in a time interval between T0 and T2 as shown by a solid line in FIG. 4C, delaying from the target value Gt, since there exist delays in the response depending on volumes of gas supply pipes and gas supply channels in the fuel cell, gas pressures Pair and Phyd, gas temperature, atmospheric pressure, and temperatures of cooling water Tw1 and Tw2, and delays in the response in the hydrogen supply valve 5, the hydrogen gas circulator device 7, and the compressor 10 in the reactant gas supply system.

Therefore, taking out an output power Pa1 from the fuel cell, which is equal to the target output power Pt as shown in FIG. 4A, means to take out the output power at an actual stoichiometric ratio smaller than an ideal one in the region of the hatching T0-T2 (referred to as deficiency in stoichiometric ratio). A repeat of that operation will deteriorate the fuel cell stack. In order to prevent the stack's deterioration by maintaining an ideal stoichiometric ratio, output power needs to be taken out at an output power Pa2 corresponding to actual gas pressure and flow rate Ga (upper limit output power shown in the broken line in FIG. 4A). In this case, however, the actual output power Pa2 does not attain the target output power Pt.

Figure 5A:
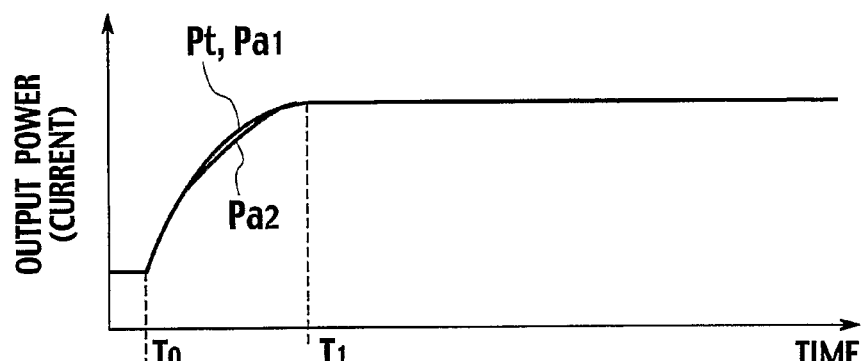
FIG. 5A-5C are time charts describing transient power generation of the fuel cell system to which the present invention is applied.
Figure 5B:
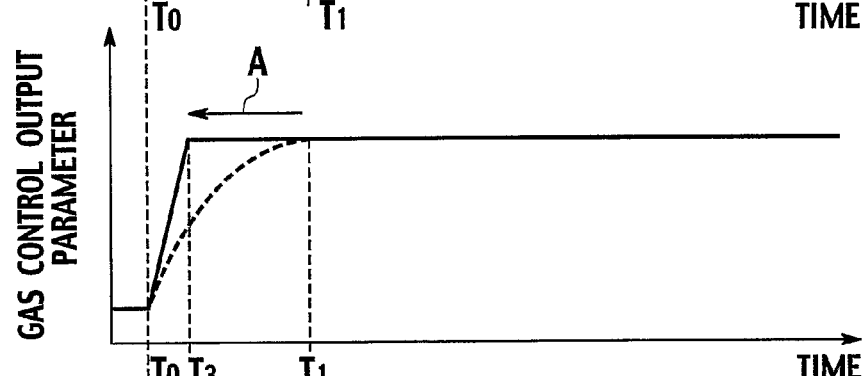
Figure 5C:
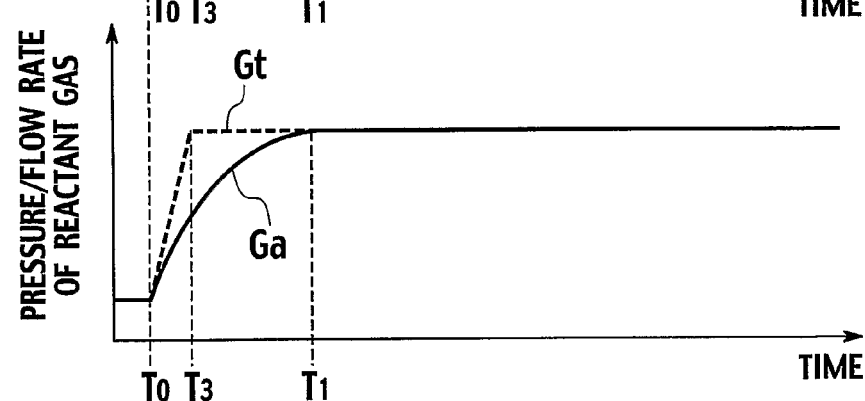

FIG. 5A to FIG. 5C show time charts of an output power (current) of the fuel cell, a gas control output parameter, and a gas pressure or flow rate as a function of time, describing transient power generation of the fuel cell system to which the present invention is applied.

For example, when a target output power Pt for the fuel cell from a vehicle control computer rises at an given rate in a time interval between T0 and T1 as shown in FIG. 5A, the gas control output parameter is caused to precede the target output power Pt in time in the direction of the arrow A in FIG. 5B so that it rises more sharply in a shorter interval between T0 and T3 than the time interval between T0 and T1. An operating point for supplying the reactant gas (gas pressure and/or flow rate of the reactant gas) is determined based on the gas control output parameter. The target value of pressure and flow rate Gt also rises at a rate equivalent to that in the gas control output parameter as shown by the broken line in FIG. 5C.

The actual gas pressure and flow rate Ga delays from the target value Gt and rises more gradually than the gas control output parameter in the time interval between T0 and T1 as shown by the solid line in FIG. 5C, since there exist delays in the response depending on volumes of gas supply pipes and gas supply channels in the fuel cell, gas pressure Pair and Phyd, gas temperature, atmospheric pressure, and temperatures of cooling water Tw1 and Tw2, and delays in the response in the hydrogen supply valve 5, the hydrogen gas circulator device 7, and the compressor 10 in this reactant gas supply system. In this case, however, the gas control output parameter which determines a target value of pressure and flow rate Gt, precedes in time the target output power Pt, so that the actual gas pressure and flow rate Ga will not delay from the target output power Pt, that is to say, it rises at a rate equivalent to the target output power Pt. As shown in FIG. 5A, an output power can be taken out from the fuel cell equal to the target output power Pt at a rising edge region (T0-T1) without deficiency in stoichiometric ratio.

First Embodiment

A first embodiment of a power generation control system for a fuel cell according to the present invention is described with reference to the flow charts in FIGS. 6 to 8. An exemplary fuel cell system to which the present invention is applied is one described in FIG. 3.

FIG. 6 is a general flow chart according to the present embodiment to be executed at every given time (for example, at every 10 ms) by the controller 30 in FIG. 3.

In FIG. 6, at step S601, the target output power of the fuel cell system is computed. At step S602, the gas control output parameter is computed. At step S603, gas pressure and flow rate are controlled based on the parameters computed at step S602. At step S604, control is performed to take out an output power from the fuel cell based on the computed value at step S601 and the process ends.

Figure 13:
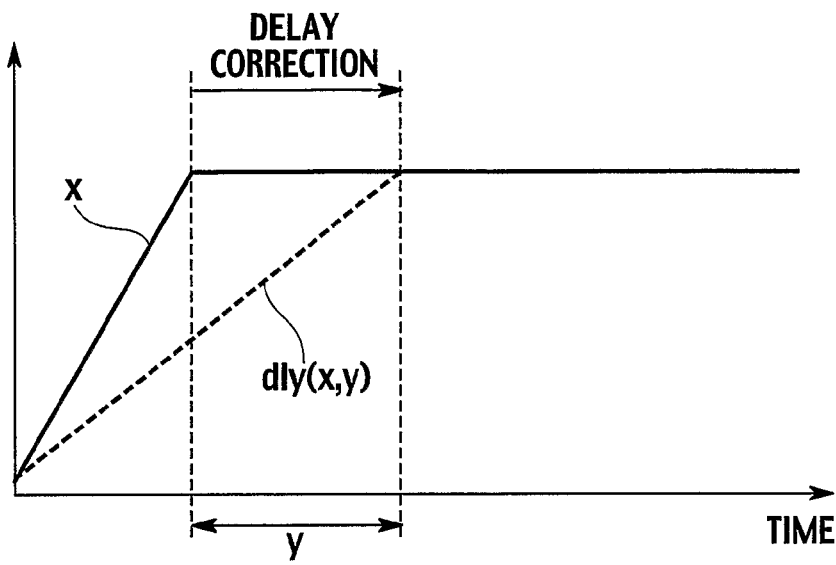
FIG. 13 explains how to perform delay correction.

FIG. 7 is a flow chart describing in detail procedures for computing the target output power at step S601 in FIG. 6. At step S701, an operation amount of an accelerator pedal of the vehicle Ac is detected. At step S702, a steady target output power Ps corresponding to the operation amount of an accelerator pedal Ac is computed using a target output power map based on the detected value at step S701. The steady target output power Ps is therefore a signal synchronized with the driver's operation amount of the accelerator pedal. At step S703, a target output power Pv actually required for the vehicle driving is computed by equation (4) using the computed value Ps at step S702, and then the process returns to the main routine of FIG. 6.

$$Pv = dly(Ps, Tp) \quad (4)$$

Where dly(x, y) is an operator to apply a delay correction to a value "x" by a given delay "y". The delay correction may be carried out by using a first-order delay correction with a time constant, or by changing the duration of signal rising edge as shown in FIG. 13. Tp is a "delay parameter" representing how much phase the vehicle performance should be delayed with respect to the operation amount of the accelerator pedal Ac. The delay parameter is suitably adjusted depending on environmental conditions under which the vehicle is used and design characteristics provided for the vehicle.

Use of the "delay parameter" to control of the reactant gas supply to the fuel cell can prevent deficiency in stoichiometric ratio by a simple computation.

FIG. 8 is a flow chart describing procedures for computation of a gas control output parameter at step S602 in FIG. 6. At step S801, at least one operating condition parameter for the fuel cell out of gas pressures Pair and Phyd, gas temperature, atmospheric pressure Patm, and temperatures of cooling water Tw1 and Tw2 is detected. At step S802, a parameter of delay in the response of the reactant gas supply system Tg is estimated based on the value detected at step S801. At step S803, a gas control output parameter Pg is computed by equation (5) in which the steady target output power Ps is applied with a delay correction of the delay operator dly(x, y) with a delay value Tp−Tg, which is the delay parameter Tp subtracted therefrom the parameter of delay in the response of the reactant gas supply system Tg, and then the process returns to the main routine of FIG. 6.

$$Pg=dly(Ps, Tp-Tg) \qquad (5)$$

The relationship of the detected operation condition parameters with delay in the response of the reactant gas supply system shows the following tendencies.

Figure 15:
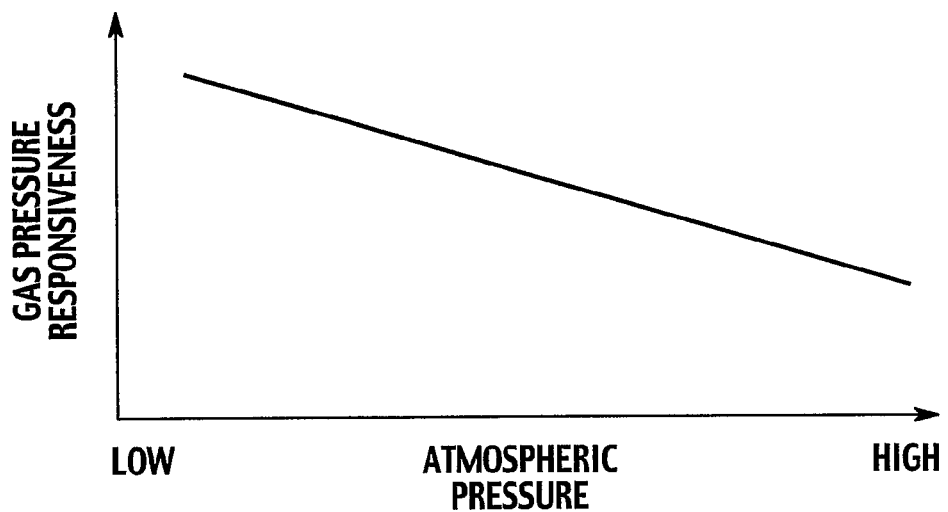
FIG. 15 shows relationship between atmospheric pressure and gas pressure responsiveness of a reactant gas supply system.
Figure 16:
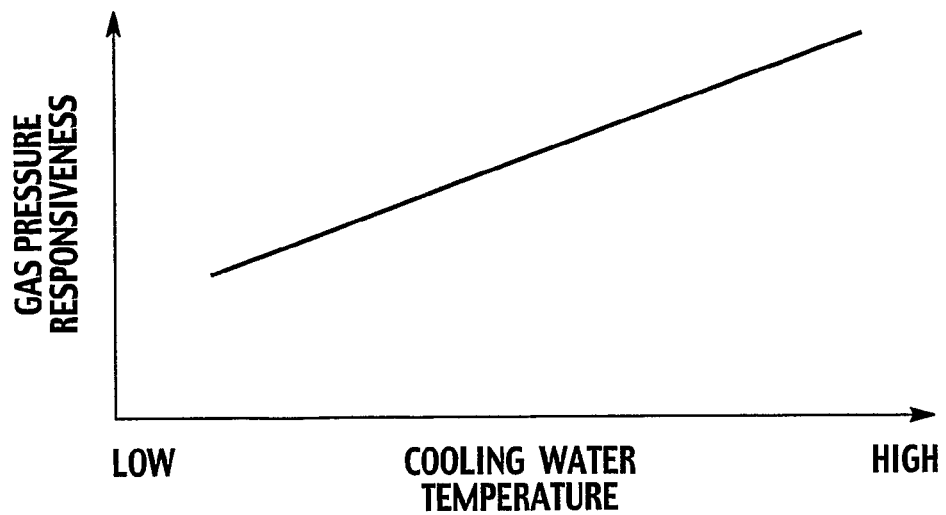
FIG. 16 shows relationship between cooling water temperature and the gas pressure responsiveness of the reactant gas supply system.

The higher atmospheric pressure Patm is, the lower (slower) the gas pressure responsiveness becomes (FIG. 15), and the higher the cooling water temperatures Tw1 and Tw2 are, the higher (quicker) the gas pressure responsiveness becomes (FIG. 16).

Figure 17:
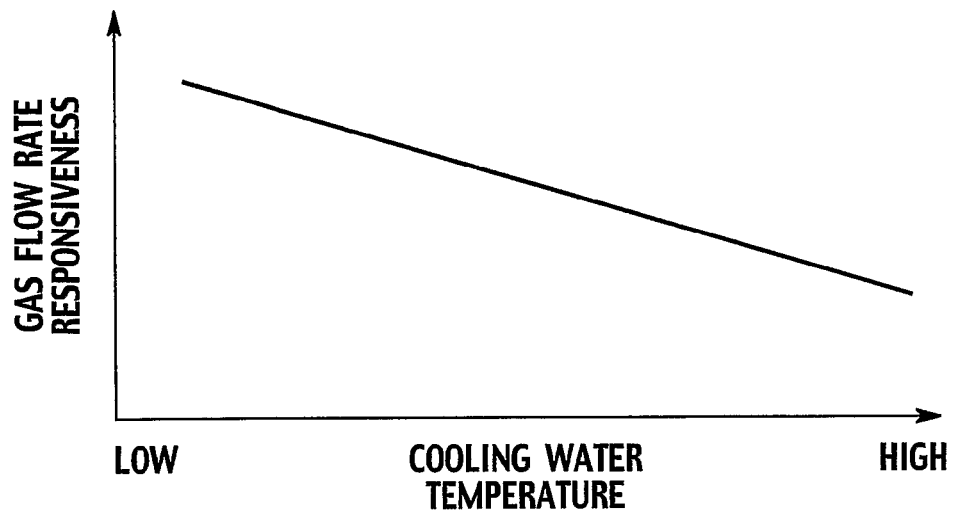
FIG. 17 shows relationship between cooling water temperature and gas flow rate responsiveness of the reactant gas supply system.
Figure 18:
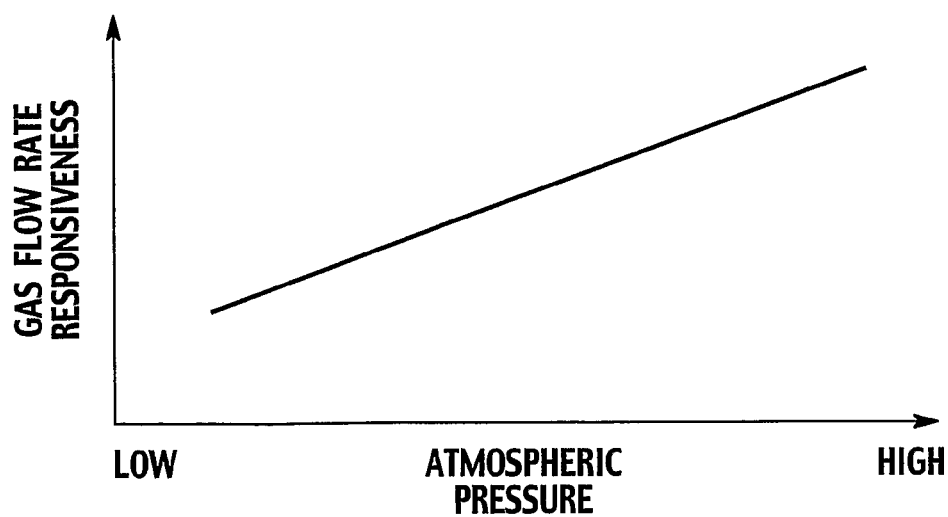
FIG. 18 shows relationship between atmospheric pressure and gas flow rate responsiveness of the reactant gas supply system.

The higher the cooling water temperatures Tw1 and Tw2 are, the lower (slower) the gas flow rate responsiveness becomes (FIG. 17), and the higher atmospheric pressure Patm is, the higher (quicker) the gas flow rate responsiveness becomes (FIG. 18).

A current delay in the response of the entire reactant gas supply system is computed based on the delay characteristics of actuators and the delay values obtained from the detected operation condition parameters based on the relationship of operation condition parameters with delay in the response of the reactant gas supply system. This computation can be performed using data of delay values for each parameter obtained in advance by a desk study or experiment and adding or multiplying the data obtained.

When a parameter of delay in the response of the reactant gas supply system Tg estimated based on the detected values of operation condition parameters is equal to a delay parameter Tp with respect to the operation amount of an accelerator pedal, which is provided for the target output power Pv (Tg=Tp), an output parameter Pg for controlling supply of the reactant gas will be a requested output value corresponding to and synchronized with the operation amount of an accelerator pedal by a driver.

Thus, in the present embodiment, a delay in the response of the reactant gas supply system is estimated based on at least one operating condition parameter for a fuel cell out of gas pressure Pair and Phyd, gas temperature, atmospheric pressure Patm, and temperatures of cooling water of a stack Tw2 and Tw2, and a "target output power" signal preceding in time by the estimated delay in the response of the reactant gas supply system is taken as a "gas control output parameter." Therefore, even under the control based on a "target output power" as a vehicle drive power, the deficiency in stoichiometric ratio and a decrease in gas utility rate are prevented and the system efficiency is improved.

Second Embodiment

A second embodiment of a power generation control system for a fuel cell according to the present invention is described. An exemplary fuel cell system to which the present invention is applied is one described in FIG. 3 as is the case with the first embodiment. Duplicated explanations are omitted.

With reference to the flow charts in FIGS. 6, 9, and 10, items on controls by the power generation control system for a fuel cell according to the present embodiment will be described. Unlike the first embodiment, there do not exist parameters such as an operation amount of an accelerator pedal in the present embodiment. This is a case where the target output power is directly generated. It can also be applied to a power generation system for a fuel cell mounted in a vehicle, using an operation amount of an accelerator pedal as a control parameter.

The general flow chart of FIG. 6 is the same as that of the first embodiment, and only FIGS. 9 and 10 will be described. FIG. 9 shows procedures for computation of the target output power at step S601 in FIG. 6. The target output power Pv to be generated by the power generation control system for a fuel cell is computed at step S901 in FIG. 9, and then the process returns to the main routine of FIG. 6.

Figure 14:
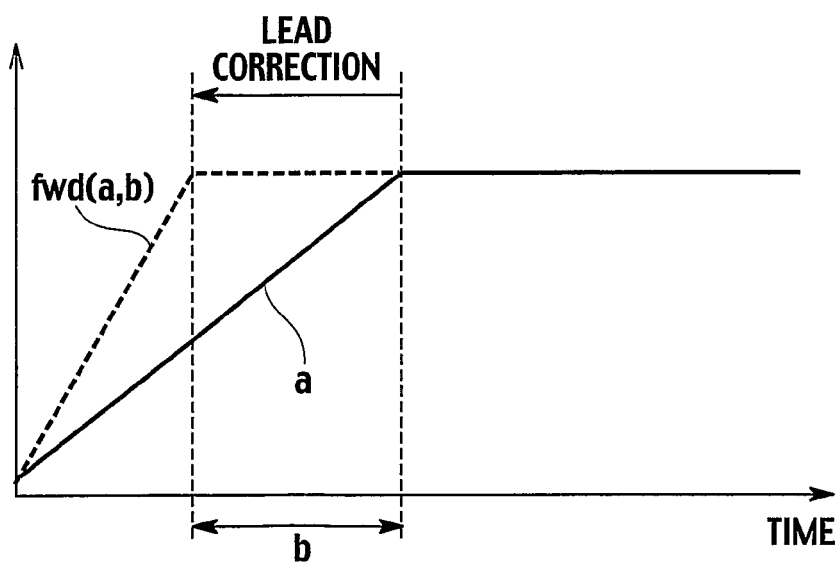
FIG. 14 explains how to perform lead correction.

FIG. 10 shows procedures for computation of the gas control output parameter at step S602 in FIG. 6. At step S1001, at least one operating condition parameter for a fuel cell is detected out of gas pressure Pair and Phyd, gas temperature, atmospheric pressure Patm, and cooling water temperatures Tw1 and Tw2. At step S1002, a parameter of delay in the response of the reactant gas supply system Tg is estimated based on the detected value at step S1001. At step S1003, the gas control output parameter is computed by equation (6) using the target output power Pv and the parameter of delay in the response of the reactant gas supply system Tg, and then the process returns to the main routine of FIG. 6.

$$Pg=fwd(Pv, Tg) \qquad (6)$$

Where fwd(a, b) is an operator to apply a lead correction to a value "a" by a given lead "b". The lead correction may be carried out by using a first order lead correction with a time constant, or by changing the duration of signal rising edge as shown in FIG. 14.

According to the second embodiment, "the gas control output parameter" is computed to be a signal preceding in time by a delay in the response of the reactant gas supply system under all operating conditions of the fuel cell with respect to "target output power". This can prevent the deficiency in stoichiometric ratio without respect to any operational conditions of the power generation system.

Third Embodiment

A third embodiment of a power generation control system for a fuel cell according to the present invention is described. An exemplary fuel cell system to which the present invention is applied is one described in FIG. 3 as is the case with the first embodiment. Duplicated explanations are omitted.

With reference to the flow charts in FIGS. 6, 11, and 12, items on controls by the power generation control system for a fuel cell according to the present embodiment will be described.

In the present embodiment, power consumption by auxiliary equipment of a fuel cell system mounted on a vehicle is taken into consideration in the control of power generation of the fuel cell.

The general flow chart of FIG. 6 is the same as that of the first embodiment, so only FIGS. 11 and 12 will be described.

FIG. 11 shows procedures for computation of the target output power at step S601 in FIG. 6. At step S1101, an operation amount of an accelerator pedal of a vehicle Ac is detected. At step S1102, a steady target net output power Ps_net excluding the power consumption of auxiliary equipment is computed, using a target output power map based on the detected value at step S1101.

At step S1103, a vehicle target net output power Pv_net actually required for vehicle running is computed by equation (7) by means of a delay operator dly(x, y) using the computed value at step S1102.

$$Pv\_net=dly(Ps\_net, Tp) \qquad (7)$$

At step S1104, a steady power consumption by auxiliary equipment Pa_s is computed, which is steadily required for generating the required output power at that time point. At step S1105, a dynamic power consumption by auxiliary equipment Pa_d is computed.

The dynamic power consumption by auxiliary equipment Pa_d is an transiently changing power consumption of auxiliary equipment, such as pump, compressor, and others, which is estimated as a sum of power consumptions of the auxiliary equipment computed from the voltage and current of auxiliary equipment, or power consumptions computed from number of rotation, torque, power-loss map data of the auxiliary equipment. At step S1106, the target output power Pv is computed by equation (8) in which the vehicle target net output power Pv_net and the dynamic power consumption by auxiliary equipment Pa_d are added, and then the process returns to the main routine of FIG. 6.

$$Pv=Pv\_net+Pa\_d \tag{8}$$

FIG. 12 shows procedures for computation of the gas control output parameter at step S602 in FIG. 6. At step S1201, at least one operating condition parameter for a fuel cell out of gas pressure Pair and Phyd, gas temperature, atmospheric pressure Patm, and temperatures of cooling water of a stack Tw1 and Tw2 is detected. At step S1202, a parameter of a delay in the response of the reactant gas supply system Tg is estimated based on detected value at step S1201. At step S1203, a gas control output parameter Pg is computed by equation (9) in which the steady target net output power Ps_net applied with a delay correction of the delay operator dly(x, y) with a delay value Tp−Tg is added to the steady power consumption by auxiliary equipment Pa_s applied with a delay correction of the delay operator dly(x, y) with a delay value Th−Tg, and then the process returns to the main routine of FIG. 6.

$$Pg=dly(Ps\_net, Tp-Tg)+dly(Pa\_s, Th-Tg) \tag{9}$$

Where, Th is a parameter expressing a time delay in the response of the power consumption of auxiliary equipment, which can be obtained by experiments in advance. Th−Tg is the parameter Th subtracted therefrom the parameter of delay in the response of the reactant gas supply system Tg.

In the present embodiment, at least one operating condition parameter for a fuel cell out of gas pressure Pair and Phyd, gas temperature, atmospheric pressure Patm, and cooling water temperatures Tw1 and Tw2 is detected, and a delay in the response of the reactant gas supply system is estimated momentarily based upon the detected parameter. Alternatively, the control can be conducted based on the maximum value of delay in the response of the reactant gas supply system under all possible operation conditions, which can be obtained by experiments in advance.

It is understood the lead correction is realized by a first-order lead correction combined with a lowpass filter with a small time constant.

The present disclosure relates to subject matters contained in Japanese Patent Application No. 2004-277925, filed on Sep. 24, 2004, and Japanese Patent Application No. 2004-277926, filed on Sep. 24, 2004, the disclosures of which are expressly incorporated herein by reference in their entirety.

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein.

INDUSTRIAL APPLICABILITY

In the above-mentioned power generation control system for a fuel cell, the output power is extracted from the fuel cell according to a signal of the "target output power", while supply of reactant gas to the fuel cell is controlled based on a signal preceding in time the target output power. Therefore, output power can be taken out as requested without causing insufficient supply of the reactant gas.

The invention claimed is:

1. A power generation control system for a fuel cell comprising:
    a target output power computing unit for computing a target output power of the fuel cell;
    an output power control unit for taking output power from the fuel cell based on the target output power computed by the target output power computing unit;
    a gas control output parameter computing unit for computing an output parameter for controlling supply of reactant gas to the fuel cell as a signal preceding the target output power in time;
    a gas control unit for controlling an operating point for the supply of reactant gas based on the output parameter computed by the gas control output parameter computing unit;
    an operation condition detecting unit for detecting a value of at least one of pressure of the reactant gas supplied to the fuel cell, temperature of the reactant gas supplied to the fuel cell, atmospheric pressure, and temperature of cooling water for the fuel cell; and
    a gas-supply-system delay estimating unit for estimating a delay in a response of a reactant gas supply system based on the detected value of the operation condition detecting unit.

2. A power generation control system according to claim 1, wherein the target output power computing unit is configured to compute the target output power having a delay characteristic with respect to a driver's operation of an accelerator pedal, and wherein the gas control output parameter computing unit is configured to compute the output parameter synchronized with the operation of the accelerator pedal.

3. A power generation control system according to claim 2, wherein the gas control output parameter computing unit is configured to compute the output parameter based on a delay parameter which determines the delay characteristic of the target output power with respect to the operation of the accelerator pedal, and the delay in the response of the reactant gas supply system estimated by the gas-supply-system delay estimating unit.

4. A power generation control system according to claim 1, wherein the gas control output parameter computing unit is configured to compute the output parameter as a signal preceding the target output power computed by the target output power computing unit in time by the delay in the response of the reactant gas supply system.

5. A power generation control system according to claim 4, wherein the gas control output parameter computing unit is configured to compute the output parameter as a signal preceding the target output power computed by the target output power computing unit in time by the delay in the response of the reactant gas supply system estimated by the gas-supply-system delay estimating unit.

6. A power generation control system according to claim 1, wherein the target output power computing unit is configured to compute the target output power by adding an estimated value of transiently changing power consumption of auxiliary equipment to a target net output power required by a vehicle.

7. A power generation control system according to claim 6, wherein the gas control output parameter computing unit is configured to compute the output parameter by adding a steady power consumption by the auxiliary equipment and a steady target net output power excluding power consumption by the auxiliary equipment.

8. A method of controlling power generation of a fuel cell, comprising:

computing a target output power of a fuel cell;

taking output power from the fuel cell based on the computed target output power;

computing an output parameter for controlling supply of reactant gas to the fuel cell as a signal preceding in time the target output power;

controlling an operating point for the supply of reactant gas based on the output parameter;

detecting a value of at least one of pressure of the reactant gas supplied to the fuel cell, temperature of the reactant gas supplied to the fuel cell, atmospheric pressure, and temperature of cooling water for the fuel cell; and estimating a delay in a response of a reactant gas supply system based on the detected value.

* * * * *